US011373663B2

(12) United States Patent
Huber

(10) Patent No.: US 11,373,663 B2
(45) Date of Patent: Jun. 28, 2022

(54) SOLUTION FOR DETERMINING AN AUTHENTICITY OF AN AUDIO STREAM OF A VOICE CALL

(71) Applicant: Telia Company AB, Solna (SE)

(72) Inventor: Michael Huber, Täby (SE)

(73) Assignee: TELIA COMPANY AB, Solna (SE)

( * ) Notice: Subject to any disclaimer, the term of this patent is extended or adjusted under 35 U.S.C. 154(b) by 215 days.

(21) Appl. No.: 16/441,766

(22) Filed: Jun. 14, 2019

(65) Prior Publication Data

US 2019/0385623 A1    Dec. 19, 2019

(30) Foreign Application Priority Data

Jun. 15, 2018 (EP) .................................... 18177899

(51) Int. Cl.
  *G10L 17/26* (2013.01)
  *G10L 19/018* (2013.01)
  *G10L 17/02* (2013.01)

(52) U.S. Cl.
  CPC ............ *G10L 19/018* (2013.01); *G10L 17/02* (2013.01); *G10L 17/26* (2013.01)

(58) Field of Classification Search
  CPC ........ G10L 19/018; G10L 17/02; G10L 17/26
  See application file for complete search history.

(56) References Cited

U.S. PATENT DOCUMENTS

| 9,848,003 | B2 | 12/2017 | Stevens et al. | |
| 10,079,024 | B1* | 9/2018 | Bhimanaik | G10L 17/06 |
| 2001/0019618 | A1 | 9/2001 | Rhoads | |
| 2015/0016661 | A1* | 1/2015 | Lord | H04N 21/2668 382/100 |
| 2015/0382191 | A1 | 12/2015 | Muttik | |
| 2018/0146370 | A1* | 5/2018 | Krishnaswamy | G06F 16/951 |

FOREIGN PATENT DOCUMENTS

EP    2961127 A1    12/2015

OTHER PUBLICATIONS

EP Search Report, dated Sep. 21, 2018, from corresponding EP application No. 18 17 7899.

* cited by examiner

*Primary Examiner* — Thomas H Maung
(74) *Attorney, Agent, or Firm* — Nixon & Vanderhye

(57) ABSTRACT

Disclosed is a method for determining an authenticity of at least a portion of an audio stream of a voice call connection. In the method it is received a request for confirming an authenticity of at least portion of an audio stream of a voice call connection; detected a number of voice call connection specific watermark patterns included in the portion of the audio stream in question; and set, in accordance with a detection of the number of the voice call connection specific watermark patterns included in the portion of the audio stream, a detection result to express one of the following: i) the portion of the audio stream is authentic, ii) the portion of the audio stream is nonauthentic. Also disclosed is a network node, a computer program product and a system.

14 Claims, 4 Drawing Sheets

US 11,373,663 B2

SOLUTION FOR DETERMINING AN AUTHENTICITY OF AN AUDIO STREAM OF A VOICE CALL

TECHNICAL FIELD

The invention concerns in general the technical field of telecommunications. More particularly, the invention concerns a solution relating to a security of voice calls.

BACKGROUND

More and more contracts are nowadays made through voice communication. This refers to a situation in which a user confirms a contractual relationship with another party with his or her voice by saying a predetermined phrase or word, for example. This kind of contract may e.g. relate to buying goods through a call connection. An example of this may e.g. be updating of insurances of a person. In order to proving an establishment of the contractual relationship afterwards the party offering goods may store the voice communication used for purchasing the goods in question. Sophisticated voice recognition mechanisms may be used to recognize the person being a party of the contract in case the person denies the contractual relationship from his or her perspective.

However, a possibility to establish contracts through voice signing has turned out to be vulnerable to misconducts. Criminals have invented a way to capture person's voice and even got the person to say some predetermined words, which may be used for signing the voice contracts by the criminal, and in this manner cause problems to the person in question. This kind of situation may be achieved so that a criminal has set up a system as schematically illustrated in FIGS. 1A and 1B. Criminal's system 102 may comprise a terminal device 110 by means of which it is possible to establish a voice call to a person possessing a terminal device 120. The voice call may be established over a communication network 130, such as a mobile communication network. The criminal's terminal device 110 may be coupled to data storage 122 belonging to the criminal's system 102 for storing audio data e.g. in a form of digital data. The data stored in the data storage 122 may be accessible by a computing device 124 belonging to the criminal's system 102 by means of which the stored data may be processed. Now, the criminal may initiate a voice call with the terminal device 110 to a person having the terminal device 120. During the voice call the criminal may set questions to the person and record the answers as an audio data. The questions are defined so that desired answers may be received, such as the person's name and words like 'yes' and any similar. When the call is made the criminal may process the recorded audio data e.g. by separating words and even sentences from a context and even re-arranged the recordings.

Next, the criminal may initiate a call connection to a party offering goods for sale with the criminal's system 102. This is illustrated in FIG. 1B wherein an entity offering goods may have established a system 104 comprising a terminal device 140 communicatively coupled to data storage 142 and finally to some backend system, such as a computing device 144. By means of the system 104 the party offering goods may manage an ordering process and provide an opportunity to purchase goods through voice contracting. When the criminal contacts the merchant's terminal device 140 the system may generate e.g. automatically inquiries e.g. in a form of voice prompt to which the party buying goods, i.e. the criminal in the present case, gives answers with voice. Now, as the criminal has stored the predetermined answers in a form of other person's voice the criminal may utilize the stored answers by choosing appropriate answers in the purchasing process and in that manner cause problems to the person whose voice is used in the process. Additionally, in the worst case the criminal may purchase the goods to himself or herself and the person whose voice is used in the purchase gets invoiced for the goods due to established contract through the voice recognition.

In order to avoid the above described situations there is need to develop solutions by means of which users' security may be improved.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a network node, a computer program product and a system for determining an authenticity of at least a portion of an audio stream of a voice call connection.

The objectives of the invention are reached by a method, a network node, a computer program product and a system as defined by the respective independent claims.

According to a first aspect, a method for determining an authenticity of at least a portion of an audio stream of a voice call connection is provided, the method comprising: receiving a request for confirming an authenticity of at least portion of an audio stream of a voice call connection, the request carrying the portion of the audio stream to be confirmed; detecting, from the portion of the audio stream, a number of voice call connection specific watermark patterns included in the portion of the audio stream in question; and setting, in accordance with a detection of the number of the voice call connection specific watermark patterns included in the portion of the audio stream, a detection result to express one of the following: i) the portion of the audio stream is authentic, ii) the portion of the audio stream is nonauthentic.

A generation of the voice call connection specific watermark pattern may be performed with a voice call connection specific encryption scheme.

A plurality of individual watermarks may be generated with the voice call connection specific encryption scheme, the plurality of watermarks included over the audio stream.

Moreover, the voice call connection specific watermark pattern included in the audio stream may comprise an identifier for identifying the voice call connection to which the portion of the audio stream relates to.

The detection result of the portion of the audio stream may be set authentic in response to a detection that the number of the voice call connection specific watermark pat-terns in the portion of the audio stream is one.

Furthermore, the detection result of the portion of the audio stream may be set nonauthentic in response to a detection that the number of the voice call connection specific watermark patterns in the portion of the audio stream is more than one.

According to a second aspect, a network node for determining an authenticity of at least a portion of an audio stream of a voice call connection is provided, the network node comprising: at least one processor; at least one memory including computer program code; the at least one memory and the computer program code configured to, with the at least one processor, cause the network node to perform: receive a request for confirming an authenticity of at least portion of an audio stream of a voice call connection, the request carrying the portion of the audio stream to be confirmed; detect, from the portion of the audio stream, a number of voice call connection specific watermark patterns included in the portion of the audio stream in question; and set, in accordance with a detection of the number of the voice call connection specific watermark patterns included in the portion of the audio stream, a detection result to express one of the following: i) the portion of the audio stream is authentic, ii) the portion of the audio stream is nonauthentic.

The network node may be configured to perform a generation of the voice call connection specific watermark pattern with a voice call connection specific encryption scheme.

The network node may be configured to generate a plurality of individual watermarks with the voice call connection specific encryption scheme, the plurality of watermarks included over the audio stream.

Moreover, the voice call connection specific watermark pattern included in the audio stream may comprise an identifier for identifying the voice call connection to which the portion of the audio stream relates to.

The network node may be configured to set the detection result of the portion of the audio stream authentic in response to a detection that the number of the voice call connection specific watermark patterns in the portion of the audio stream is one.

The network node may be configured to set the detection result of the portion of the audio stream non-authentic in response to a detection that the number of the voice call connection specific watermark patterns in the portion of the audio stream is more than one.

The network node may be configured to generate at least one voice call connection specific watermark pattern to an audio stream conveyed through the network node in a context of the voice call connection.

According to a third aspect, a computer program product for confirming an authenticity of at least a portion of an audio stream of a voice call connection is provided, which, when executed by at least one processor, cause a network node to perform the method as described above.

According to a fourth aspect, a system for determining an authenticity of at least a portion of an audio stream of a voice call connection is provided, the system comprising: a network node, and a verification server; in the system: the verification server is configured to provide at least portion of an audio stream of a voice call connection to the network node and to request a confirmation of an authenticity of the at least portion of the audio stream of the voice call connection; and in response to a receipt of the request the network node is configured to detect, from the portion of the audio stream, a number of voice call connection specific watermark patterns included in the portion of the audio stream in question, and set, in accordance with a detection of the number of the voice call connection specific watermark patterns included in the portion of the audio stream, a detection result to express one of the following: i) the portion of the audio stream is authentic, ii) the portion of the audio stream is non-authentic.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
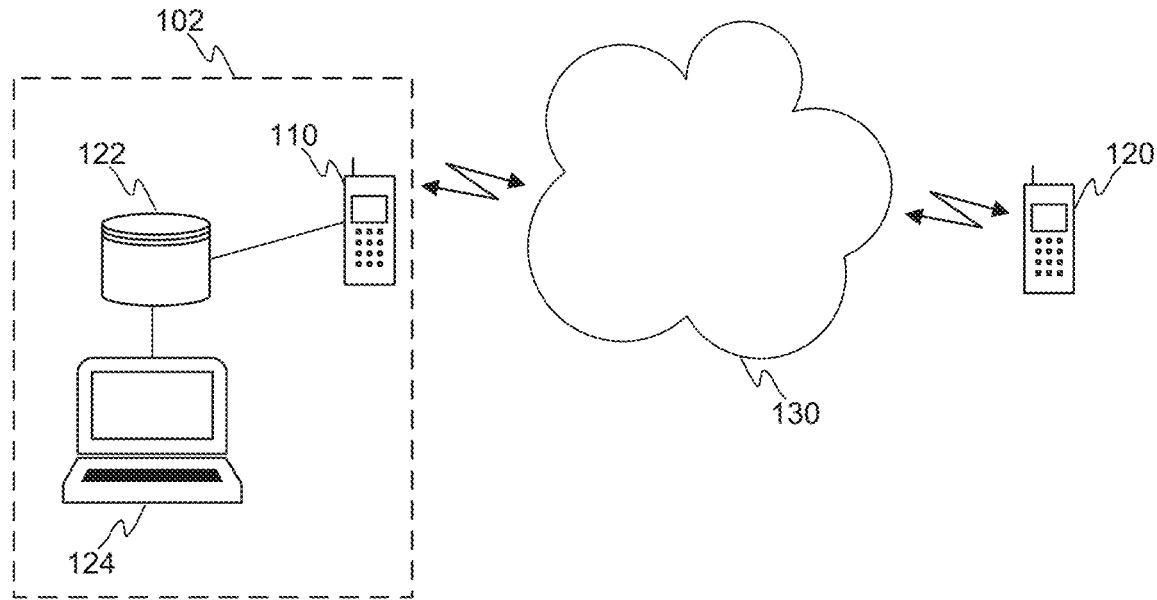
FIGS. 1A and 1B illustrate schematically communication environments used for criminal purposes in voice contracting according to prior art.
Figure 1B:
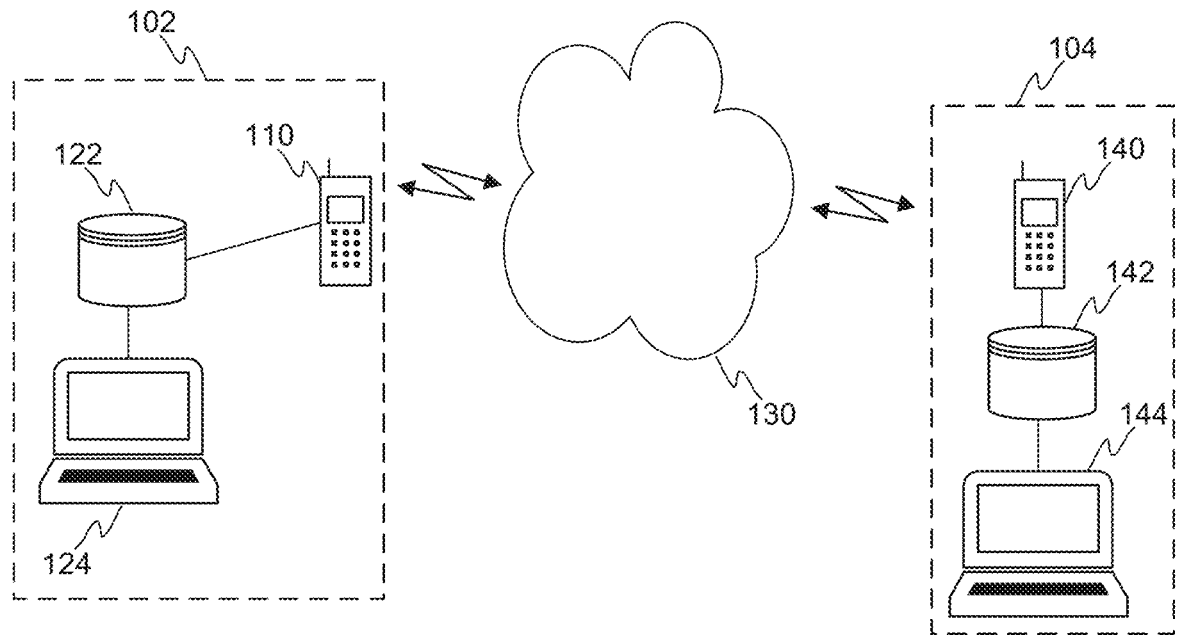
Figure 2:
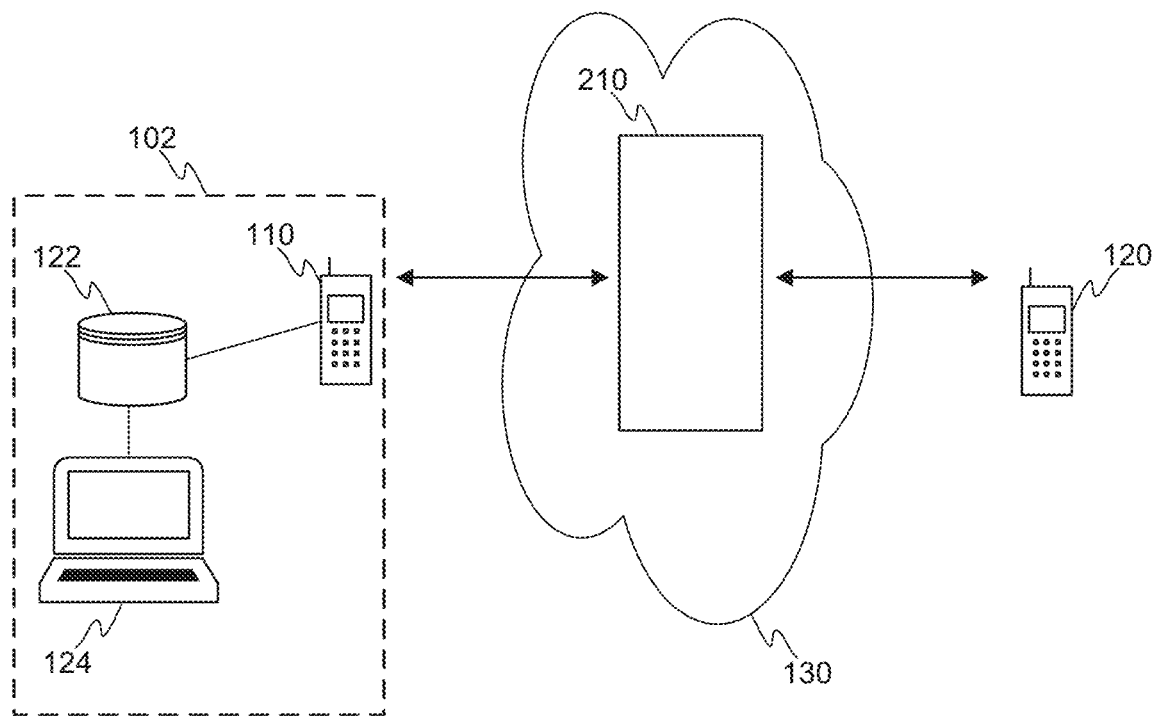
FIG. 2 illustrates schematically a first aspect of a communication system according to an embodiment of the invention.

FIG. 2 illustrates schematically some aspects being relevant for enabling the present invention. At least some aspects are illustrated in a communication system in which a first entity is communicating, with a voice call connection, with a second entity. In FIG. 2 a system of the first entity is referred with 102 and the entity may be considered as a non-trusted party, such as a criminal, for the purpose of describing the aspects of the present invention. The system of the first entity may comprise the corresponding devices as in FIG. 1A. In other words, the system 102 may be implemented so that a terminal device 110 may be coupled to data storage 122 belonging to the criminal's system 102 for storing audio data e.g. in a form of digital data. The data stored in the data storage 122 may be accessible by a computing device 124 belonging to the criminal's system 102 by means of which the stored data may be processed.

The first system 102 may communicate with a second entity with a voice call connection over a communication network 130. The second entity is represented with a terminal device 120 in FIG. 2 and shall be considered as a trusted party for the purpose of describing the aspects of the present invention. The voice call connection may be established by any of the entities. The first entity 102 has a capability to record at least portion of an audio stream conveyed over the voice call connection and especially those portions of the audio stream which are said by the person using the terminal device 120. One aim of the first entity 102, i.e. the criminal, is to achieve the second party to say such words, or expressions, which may be used in a context of another service by the criminal e.g. for making contracts with the recorded audio stream, or portions of it.

For the purpose of the present invention a service may be offered to any entity, such as the second entity, which may provide data in the audio stream of voice call connections in which the second entity is a party. For example, the telecom operator may offer this kind of service to its customers and the customer may indicate in one way or another that he/she is willing to activate the service. By activating the service at least some voice calls, or all the voice calls, are conveyed through a network node 210 providing data in the audio stream as will be described.

Now, for describing at least some aspects of the present invention it is assumed that the second party has activated the service for providing data in the audio stream of the voice call connection. As mentioned at least some voice calls in which the second party is involved in, such as a destination party, are configured to be directed through the network node 210 to the second party. The network node 210 is configured to generate digital data to be included in the voice data of the voice call connection. The digital data refers to so-called watermark data which may, for a purpose of the present invention, be understood as a marker embedded in a noise-tolerant signal, such as an audio signal. The watermarking may be understood as a process of hiding digital data in a carrier signal. According to an embodiment of the present invention the network node 210 may be configured to perform the watermarking under a predetermined scheme in which the watermark may be embedded in the voice data at a predetermined pace. The pace may be defined to be regular or irregular. The watermarking may be implemented so that the watermark is generated and enclosed only when the person of the terminal device 120 speaks or alternatively the watermarking may be performed throughout the voice call session. The generation of the watermarks may be performed so that each generated watermark is distinguishable from other watermarks. For example, each watermark may carry an individual identifier. In some embodiment the individual identifier may comprise a serial number of the watermark. The serial number is not necessarily a running number but based on the serial number it may be determined its position within the series. Alternatively or in addition, the individual identifier may be implemented with a hash function or with a key pair. Further, the embedding of the watermark in the audio stream may be performed as hidden or detectable from the audio stream. Moreover, the network node 210 may be configured to generate an identifier for a session during which the watermarking is performed wherein the session identifier may be linked with the generated watermarks. In some other embodiment another device, or entity, is configured to perform the watermarking, but the network node 210 may have access to the information relating to the watermarking, such as type of watermarks, aspects relating to the voice stream and/or time related aspects of the watermarking and so on.

Figure 3:
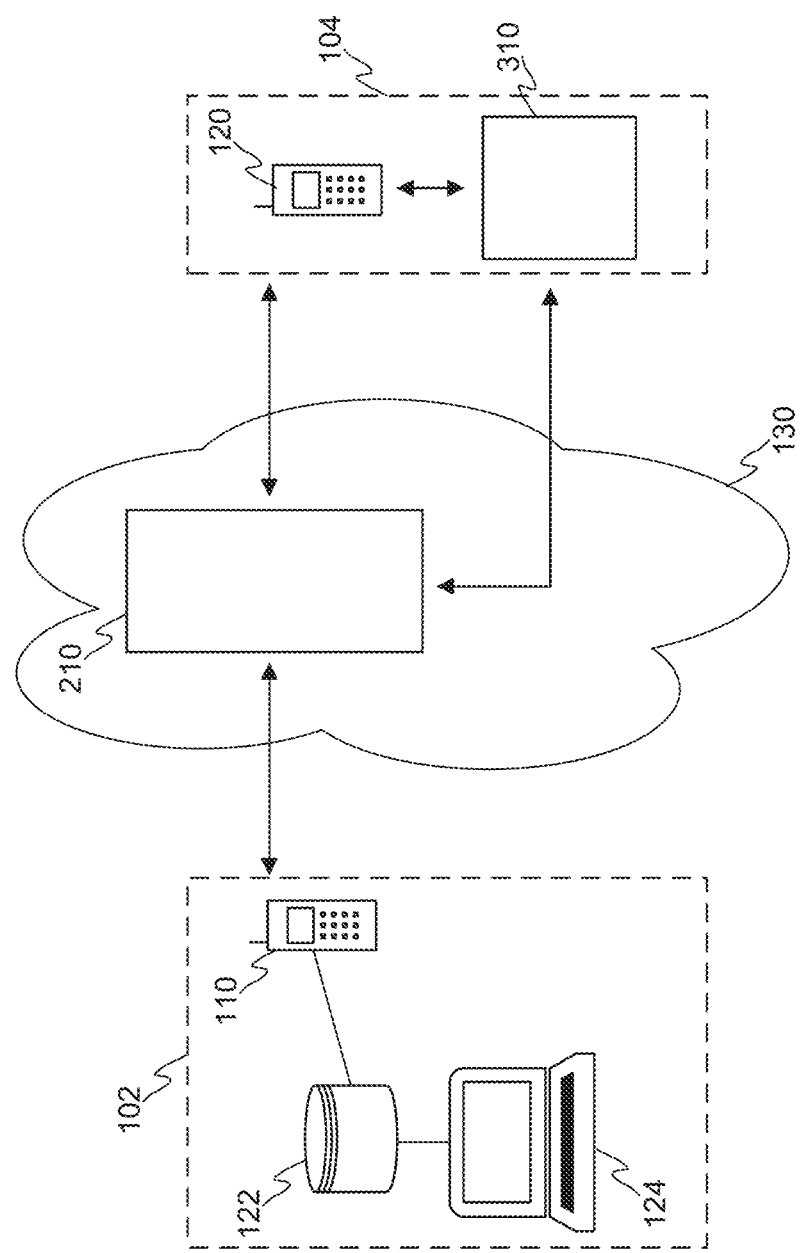
FIG. 3 illustrates schematically a second aspect of a communication system according to an embodiment of the invention.

Now, the first party, i.e. the criminal, may have called to the second party and recorded at least portions of the voice data output by the second party during the voice call. The recording, or recordings, may be stored in the data storage 122. Due to the implementation the voice data stored in the data storage comprises watermarks which are generated by the network node 210 to the voice data stream during the voice call. Hence, the first party possesses voice data embedded with watermark. The first party is now willing to use the recorded portions of the voice data for his/her own purposes. Let's now assume that the first party is willing to establish a contract with an entity represented with a system 104 in FIG. 3 through a voice call connection. The establishment of contracts with voice may be implemented so that the system 104 is configured to generate prompts, such as questions, into which the first party 102 shall provide responses with voice, and if the responses correspond to predetermined responses, the contract may be established. Now, the system 104 is configured to generate the prompts and the first party, i.e. the criminal, may optimally provide portions of the stored recordings of the second entity represented with the terminal device 120 in FIG. 2. In other words, the criminal utilizes the recordings during the session so that the contract may be established. The entity represented by the system 104 may also have arranged that voice call connections are established through the network node 210. In other words, the voice call communication to and from the system 104 may be conveyed through the network node 210 which is configured to generate digital data to be included in the voice data of the voice call connection in the same manner as discussed in the context of FIG. 2. In other words, the voice data carried over the voice call connection between the first entity 102, or the first system, and the system 104, such as a bank, is provided with the digital data called watermark data which may be specific to the voice call connection between the mentioned entities. Moreover, the voice call connection session may be provided with a session identifier and the information may be stored by the network node 210 in a similar manner as described. Moreover, the system 104 may be configured so that it is arranged to record at least portions of voice data carried during the voice call connection session for possessing the data relating to the contract. The portions of voice data may be stored as a temporal basis or a permanent basis in a data storage accessible the system 104. The data storage may belong to the system 104. Moreover, the system 104 may comprise a verification server 310, or any corresponding means, which may be configured to communicate with the network node 210. According to an embodiment of the invention the verification server 310 may be configured to provide at least a portion of audio stream, i.e. the stored voice data received during the session when the contract was established, to the network node 210 and request verification if the voice data is received from a party who is willing to establish the contract or not.

Figure 4:
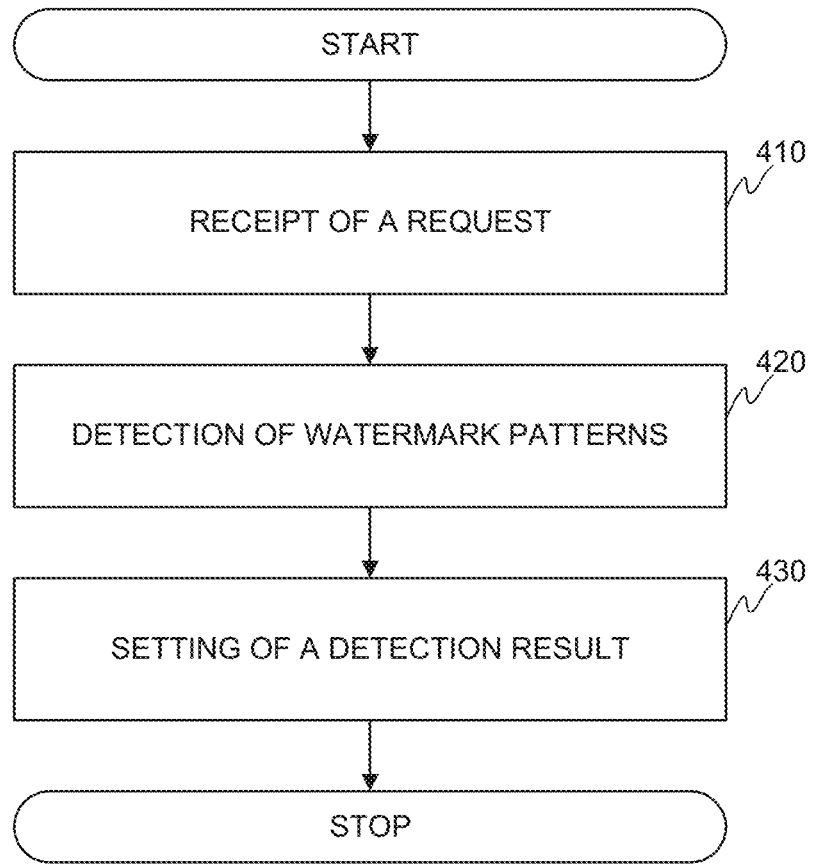
FIG. 4 illustrates schematically a method according to an embodiment of the invention.

Next it is discussed on a verification process performed by the network node 210 in more detail. The verification process is discussed by referring to FIG. 4 at least in some extent. The verification process performed by the network node 210 may be initiated in response to a receipt of a request 410 for determining, or confirming, an authenticity of at least portion of an audio stream of a voice call connection received by the verification server 310. Advantageously, the request carries the portion of the audio stream to be confirmed. According to another embodiment the network node 210 may be configured to request the audio stream from the verification server 310, or from any other entity, such as from a data storage, in response to the receipt of the request. The request may e.g. carry information on the audio stream, such as a network location into which the audio stream is stored as well as other information, such as an access code to the network location and/or the audio stream in question. In response to accessing the portion of the audio stream to be verified the network node 210 may be configured to detect 420, from the portion of the audio stream, a number of call connection specific watermark patterns included in the portion of audio stream to be verified. The detection may be based on an identification of watermarks in the audio stream e.g. by searching predetermined data patterns from the audio stream. The predetermined data pattern may e.g. refer to a comparison of the stored data relating to the generated watermarks during the voice call connection to data derivable from the portion of the audio stream under verification and based on a number of matches further conclusions may be made. In step 430 according to an embodiment of the method a detection result may be set in accordance with a detection of the number of call connection specific watermark patterns. The detection result may e.g. be that it indicates that the portion of the audio stream is authentic or nonauthentic. More specifically, the detection result may be set authentic if there is detected only one voice call connection specific watermark pattern in the portion of the audio stream. On the other hand, if the detection generates a detection result indicating that the portion of the audio stream comprises a plurality of voice call connection specific watermark patterns, i.e. that there are included watermarks from a plurality of voice call connection sessions, it may be determined that the portion of the audio stream is nonauthentic. This corresponds to a situation in which a criminal is trying to use stored portions of audio stream from a voice call connection for illegal purposes. In response to the setting the detection result by the network node 210 the detection result may be conveyed to the verification server 310 for further processing. For example, the verification server 310 may be configured to cancel the established contract and to cancel a provision of a service or a product into which the contract was entitled to. Alternatively or in addition, the verification server 310 may be configured to generate a notification to a predetermined party for indicating the detection result. The party may e.g. be an authority especially if the detection result indicates that the portion of the audio stream is nonauthentic.

The description of at least some aspects of the present invention is provided in an environment wherein the network node 210 is configured to perform the watermarking function, storing of information on the watermarking and the determination of an authenticity of at least portion of the audio stream of the voice call connection. However, it may be arranged that each of these functionalities are performed by separate entities, such as dedicated network nodes, which are configured to communicate with each other in a manner that the operation may be performed. Advantageously the entities are controlled by a trusted party, such as a telecommunication operator, who has high security standard in the communication network as well as access to voice call connections.

Figure 5:
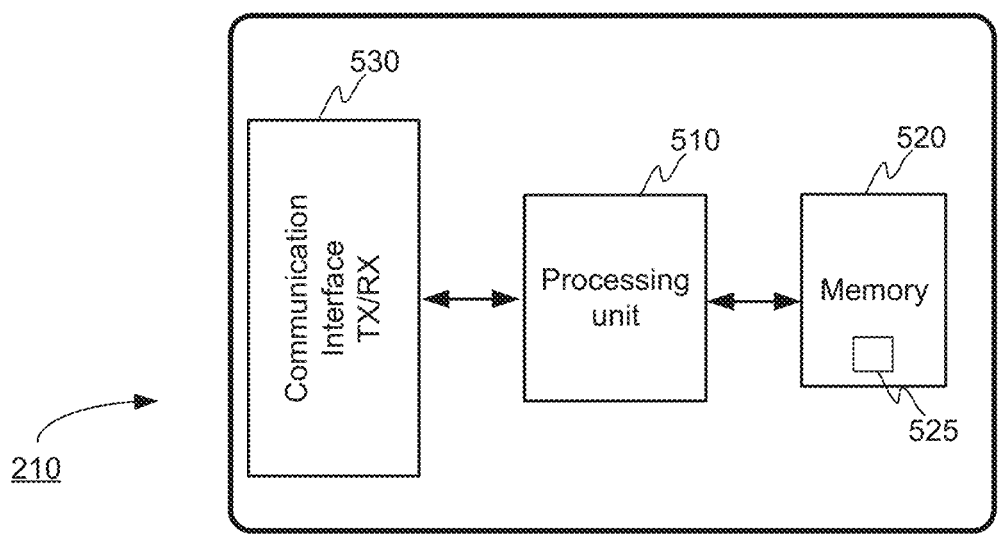
FIG. 5 illustrates schematically a network node according to an embodiment of the invention.

Moreover, FIG. 5 illustrates schematically a network node 210, such as a server or a distributed server functionality, belonging to the system according to an embodiment of the invention. The network node 210 may be communicatively coupled to other entities, such as with a verification server 310 and/or with a first entity and/or a second entity, either wired or wireless communication technology implemented by a communication interface 530 of the network node 210. The communication interface 530 may comprise necessary hardware and software components, such as a modem, for implementing the communication. Furthermore, the network node 210 may comprise a processing unit 510 comprising one or more processors for performing at least some of the method steps as described. The processing unit 510 may be configured to generate the operational instructions causing the network node 210 to operate accordingly by executing portions of computer program code 525 stored in a memory 520 of the network node 210. For an avoidance of doubt the verification server may comprise the corresponding elements and entities as schematically illustrated in FIG. 5.

Some aspects of the present invention may relate to a computer program product implementing the method when the computer program product is executed by at least one processor. In other words, the execution of the computer program product may cause a network node 210 to perform the method as described.

At least some of the entities as described above may establish a system according to an embodiment of the present invention for determining an authenticity of at least a portion of an audio stream of a voice call connection. The system according to an embodiment of the invention may comprise a network node 210 and a verification server 310. The verification server 310 may be configured to provide at least portion of an audio stream of a voice call connection to the network node 210 and to request a confirmation of an authenticity of the at least portion of the audio stream of the voice call connection. Furthermore, in response to a receipt of the request the network node 210 may be configured to detect 420, from the portion of the audio stream, a number of voice call connection specific watermark patterns included in the portion of the audio stream in question, and set 430, in accordance with a detection of the number of the voice call connection specific watermark patterns included in the portion of the audio stream, a detection result to express one of the following: i) the portion of the audio stream is authentic, ii) the portion of the audio stream is nonauthentic. The authenticity of the portion of the audio stream may be determined by the system on the same principles as described in the context of the method description.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for determining an authenticity of at least a portion of an audio stream of a specific voice call connection session between a terminal device of a plurality of terminal devices and an entity device, the method comprising:

receiving, by a network node, a request from the entity device, to confirm an authenticity of at least the portion of the audio stream obtained from the terminal device during the specific voice call connection session between the terminal device and the entity device, the request carrying the portion of the audio stream to be confirmed;

detecting, by the network node, from the portion of the audio stream of the specific voice call connection session between the terminal device and the entity device, at least one voice call connection specific watermark pattern included in the portion of the audio stream, each of the at least one voice call connection specific watermark pattern in the portion of the audio stream representing a respective voice call connection session between any one of the plurality of terminal devices and the entity device; and setting, by the network node, in accordance with a detection of the at least one voice call connection specific watermark pattern included in the portion of the audio stream of the specific voice call connection session between the terminal device and the entity device, a detection result to express one of: i) the portion of the audio stream is authentic, and ii) the portion of the audio stream is nonauthentic, wherein each of the at least one voice call connection specific watermark pattern is generated by the network node, with an individual identifier unique to the respective voice call connection specific watermark pattern so that each of the at least one generated voice call connection specific watermark pattern is distinguishable from each other, the individual identifier identifying the respective voice call connection session between any one of the plurality of terminal devices and the entity device to which the portion of the audio stream relates, and wherein a generation of the voice call connection specific watermark pattern is performed with a voice call connection specific encryption scheme.

2. The method of claim 1, wherein a plurality of individual watermarks is generated with the voice call connection specific encryption scheme, the plurality of watermarks included over the audio stream.

3. The method of claim 1, wherein the detection result of the portion of the audio stream is set authentic in response to a detection that the at least one voice call connection specific watermark pattern in the portion of the audio stream is one.

4. The method of claim 1, wherein the detection result of the portion of the audio stream is set nonauthentic in response to a detection that the at least one voice call connection specific watermark pattern in the portion of the audio stream is more than one.

5. The method of claim 2, wherein the detection result of the portion of the audio stream is set authentic in response to a detection that the at least one voice call connection specific watermark pattern in the portion of the audio stream is one.

6. The method of claim 1, wherein the individual identifier identifies a position of the respective at least one voice call connection specific watermark pattern in relation to positions of other voice call connection specific watermark patterns included within the portion of the audio stream.

7. A network node for determining an authenticity of at least a portion of an audio stream of a specific voice call connection session between a terminal device of a plurality of terminal devices and an entity device, the network node comprising:
   at least one processor; and
   at least one memory including computer program code,
   the at least one memory and the computer program code being configured to, with the at least one processor, cause the network node to:
      receive a request from the entity device to confirm an authenticity of at least the portion of the audio stream obtained from the terminal device during the specific voice call connection session between the terminal device and the entity device, the request carrying the portion of the audio stream to be confirmed,
      detect, from the portion of the audio stream of the specific voice call connection session between the terminal device and the entity device, at least one voice call connection specific watermark pattern included in the portion of the audio stream, each of the at least one voice call connection specific watermark pattern in the portion of the audio stream representing a respective voice call connection session between any one of the plurality of terminal devices and the entity device, and
      set, in accordance with a detection of the at least one voice call connection specific watermark pattern included in the portion of the audio stream of the specific voice call connection session between the terminal device and the entity device, a detection result to express one of: i) the portion of the audio stream is authentic, and ii) the portion of the audio stream is nonauthentic,
   wherein each of the at least one voice call connection specific watermark pattern is generated by the network node, with an individual identifier unique to the respective voice call connection specific watermark pattern so that each of the at least one generated voice call connection watermark pattern is distinguishable from each other, the individual identifier identifying the respective voice call connection session between any one of the plurality of terminal devices and the entity device to which the portion of the audio stream relates.

8. The network node of claim 7, wherein the network node is configured to perform generation of the at least one voice call connection specific watermark pattern with a voice call connection specific encryption scheme.

9. The network node of claim 7, wherein the network node is configured to generate a plurality of individual watermarks with the voice call connection specific encryption scheme, the plurality of watermarks included over the audio stream.

10. The network node of claim 7, wherein the network node is configured to set the detection result of the portion of the audio stream authentic in response to a detection that the at least one voice call connection specific watermark pattern in the portion of the audio stream is one.

11. The network node of claim 7, wherein the network node is configured to set the detection result of the portion of the audio stream non-authentic in response to a detection that the at least one voice call connection specific watermark pattern in the portion of the audio stream is more than one.

12. The network node of claim 7, wherein the network node is configured to generate the at least one voice call connection specific watermark pattern to an audio stream conveyed through the network node in a context of the voice call connection.

13. A non-transitory computer-readable medium on which is stored a computer program for confirming an authenticity of at least a portion of an audio stream of a voice call connection which, when the computer program is executed by at least one processor, cause a network node to perform the method according to claim 1.

14. A system for determining an authenticity of at least a portion of an audio stream of a specific voice call connection session between a terminal device of a plurality of terminal devices and an entity device, the system comprising:
   a network node; and
   a verification server,
   wherein the verification server is configured to provide at least a portion of the audio stream obtained from the terminal device during the specific voice call connection session between the terminal device and the entity device to the network node and to request a confirmation of an authenticity of the at least portion of the audio stream of the specific voice call connection session, and in response to a receipt of the request from the entity device, the network node is configured to
- detect, from the portion of the audio stream of the specific voice call connection session between the terminal device and the entity device, at least one voice call connection specific watermark pattern included in the portion of the audio stream, each of the at least one voice call connection specific watermark pattern in the portion of the audio stream representing a respective voice call connection session between any one of the plurality of terminal devices and the entity device, and
- set, in accordance with a detection of the at least one voice call connection specific watermark pattern included in the portion of the audio stream of the specific voice call connection session between the terminal device and the entity device, a detection result to express one of: i) the portion of the audio stream is authentic, and ii) the portion of the audio stream is nonauthentic, wherein each of the at least one voice call connection specific watermark pattern is generated by the network node, with an individual identifier unique to the respective voice call connection specific watermark pattern so that each of the at least one generated voice call connection watermark pattern is distinguishable from each other, the individual identifier identifying the respective voice call connection session between any one of the plurality of terminal devices and the entity device to which the portion of the audio stream relates.

* * * * *